US010062328B2

(12) United States Patent
Lee et al.

(10) Patent No.: US 10,062,328 B2
(45) Date of Patent: Aug. 28, 2018

(54) ORGANIC LIGHT EMITTING DISPLAY DEVICE AND DRIVING METHOD THEREFOR

(71) Applicant: SAMSUNG DISPLAY CO., LTD., Yongin-si, Gyeonggi-do (KR)

(72) Inventors: Jae Hoon Lee, Yongin-si (KR); Jin Woo Kim, Yongin-si (KR); Do Hyung Ryu, Yongin-si (KR); Jae Woo Song, Yongin-si (KR); Hae Goo Jung, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 24 days.

(21) Appl. No.: 15/222,582

(22) Filed: Jul. 28, 2016

(65) Prior Publication Data

US 2017/0032743 A1 Feb. 2, 2017

(30) Foreign Application Priority Data

Jul. 28, 2015 (KR) ........................ 10-2015-0106699

(51) Int. Cl.
*G06F 3/038* (2013.01)
*G09G 3/3233* (2016.01)

(52) U.S. Cl.
CPC ... *G09G 3/3233* (2013.01); *G09G 2320/0271* (2013.01); *G09G 2320/0285* (2013.01); (Continued)

(58) Field of Classification Search
CPC ......... G09G 3/3233; G09G 2320/0271; G09G 2320/0285; G09G 2320/045; G09G 2320/048; G09G 2320/028
(Continued)

(56) References Cited

U.S. PATENT DOCUMENTS

2003/0169218 A1* 9/2003 Kimura ................ G09G 3/3233 345/82
2006/0279490 A1 12/2006 Park et al.
(Continued)

FOREIGN PATENT DOCUMENTS

KR 10-2006-0128464 A 12/2006
KR 10-2010-0035847 A 4/2010
KR 10-2012-0094736 A 8/2012

*Primary Examiner* — Kumar Patel
*Assistant Examiner* — Kuo Woo
(74) *Attorney, Agent, or Firm* — Innovation Counsel, LLP

(57) ABSTRACT

An organic light emitting display device includes: pixels including driving transistors positioned in regions divided by scan lines and data lines; a data accumulating unit arranged to accumulate first data; a first storage unit storing current and voltage change information corresponding to a degradation of an organic light emitting diode (OLED); a second storage unit storing a compensation value corresponding at least partially to channel length modulation of the driving transistors; and a timing controller programmed to carry out an altering of first data corresponding to an ith pixel so as to generate second data to be supplied to the ith pixel, the altering carried out according to: accumulation stress information for the ith pixel, the accumulation stress information corresponding to the accumulated first data and being stored in the data accumulating unit, the current and voltage change information, and a compensation value corresponding to the ith pixel.

16 Claims, 5 Drawing Sheets

(52) U.S. Cl.
CPC . *G09G 2320/045* (2013.01); *G09G 2320/046* (2013.01); *G09G 2320/048* (2013.01); *G09G 2330/028* (2013.01)

(58) Field of Classification Search
USPC .......................................... 345/690, 82, 214
See application file for complete search history.

(56) References Cited

U.S. PATENT DOCUMENTS

| | | | | |
|---|---|---|---|---|
| 2010/0079361 | A1 | 4/2010 | Lee et al. | |
| 2012/0212516 | A1* | 8/2012 | Ahn | G09G 3/3233 345/690 |
| 2014/0160179 | A1* | 6/2014 | Ishii | G09G 3/3233 345/690 |

* cited by examiner

ORGANIC LIGHT EMITTING DISPLAY DEVICE AND DRIVING METHOD THEREFOR

CROSS-REFERENCE TO RELATED APPLICATION

This application claims priority to, and the benefit of, Korean Patent Application No. 10-2015-0106699, filed on Jul. 28, 2015, in the Korean Intellectual Property Office, the entire contents of which are incorporated herein by reference in their entirety.

BACKGROUND

1. Field

Embodiments of the present invention relate generally to an organic light emitting display device and driving methods therefor. More particularly, embodiments of the present invention relate to an organic light emitting display device capable of compensating for a degradation of an organic light emitting diode (OLED), and driving methods therefor.

2. Description of the Related Art

As information technology has developed, the importance of display devices as connection media between users and information has emerged. In line with this, the use of display devices such as liquid crystal display devices, organic light emitting display devices, and plasma display panels (PDPs) has increased.

Among display devices, an organic light emitting display device displays an image using an OLED generating light according to hole-electron recombination, which advantageously has a fast response speed and is driven at low power consumption.

The organic light emitting display device includes a plurality of pixels positioned in regions divided by a plurality of data lines and scan lines. Each of the pixels generally includes an OLED, two or more transistors including a driving transistor, and one or more capacitors.

The OLED included in each of the pixels has been found to degrade with the passage of time, and in particular, image brightness decreases over time. Thus, a method for compensating for this degradation of the OLED is required.

Meanwhile, the driving transistor included in each of the pixels is driven in its saturation region. When the driving transistor is driven in the saturation region, ideally, current should be uniformly maintained regardless of change in a voltage (hereinafter, referred to as a "Vds") between a drain electrode and a source electrode. However, current actually varies according to a change in the voltage Vds, due to channel length modulation of the driving transistor. Thus, a method for compensating for degradation of the OLED may take into account channel length modulation of the driving transistor.

SUMMARY

An organic light emitting display device according to an embodiment of the present invention includes: pixels including driving transistors positioned in regions divided by scan lines and data lines; a data accumulating unit arranged to accumulate first data; a first storage unit including current and voltage change information corresponding to a degradation of an organic light emitting diode (OLED); a second storage unit storing a compensation value corresponding at least partially to a channel length modulation of the driving transistors; and a timing controller programmed to carry out an altering of first data corresponding to an ith (where i is a natural number) pixel so as to generate second data to be supplied to the ith pixel, the altering carried out according to: accumulation stress information for the ith pixel, the accumulation stress information corresponding to the accumulated first data and being stored in the data accumulating unit, the current and voltage change information, and a compensation value corresponding to the ith pixel.

A value of the second data may be set so as to compensate for the degradation of the organic light emitting diode (OLED) included in the ith pixel.

The organic light emitting display device may further include: a data driver programmed to generate a data signal by using the second data to be supplied to the ith pixel, and to supply the data signal to a data line connected to the ith pixel.

An organic light emitting display device according to an embodiment of the present invention includes: pixels including driving transistors positioned in regions divided by scan lines and data lines, each of the driving transistors is controlled an amount of current flowing from a first power source to a second power source by way of an organic light emitting diode (OLED); a data accumulating unit arranged to accumulate first data; a first storage unit storing current and voltage change information corresponding to a degradation of the OLED; a second storage unit storing output grayscale information for compensating an input grayscale for a change in a voltage of the first power source; and a timing controller programmed to carry out an altering of first data corresponding to an ith (where i is a natural number) pixel so as to generate second data to be supplied to the ith pixel, the altering carried out according to: accumulation stress information for the ith pixel, the accumulation stress information corresponding to the accumulated first data and being stored in the data accumulating unit, the current and voltage change information, and output grayscale information corresponding to the ith pixel.

A value of the second data may be set so as to compensate for the degradation of the organic light emitting diode (OLED) included in the ith pixel.

The input grayscale may be a grayscale of the first data, and the output grayscale may be a grayscale of the second data.

The output grayscale information may correspond to two or more voltage values of the first power source.

The timing control unit may be programmed to: extract degradation information for the ith pixel, the degradation information corresponding to accumulation stress information for the ith pixel, detect a change in drain and source voltages of the driving transistor, the change in drain and source voltages corresponding to the extracted degradation information, and extract the output grayscale information from the second storage unit, the output grayscale information corresponding to the change in drain and source voltages.

The timing controller may be further programmed to interpolate the output grayscale information from the two or more voltage values of the first power source.

The organic light emitting display device may further include: a data driver programmed to generate a data signal by using second data to be supplied to the ith pixel, and to supply the data signal to a data line connected to the ith pixel.

A method of driving an organic light emitting display device according to an embodiment of the present invention includes: storing current and voltage change information in a first storage unit, the current and voltage change information corresponding to a degradation of an organic light emitting diode; storing compensation information in a second storage unit, the compensation information corresponding to channel length modulation for driving transistors of pixels of the display device; accumulating first data in a data accumulating unit, the first data corresponding to one or more images to be displayed by the pixels; and compensating first data corresponding to an ith (where i is a natural number) pixel by using accumulation stress information of the ith pixel, the current and voltage change information, and the compensation information, so as to generate second data to be supplied to the ith pixel.

The compensation information may comprise at least one value for compensating for the channel length modulation of the driving transistors.

The compensation information may be output grayscale information for altering an input grayscale according to a change in the voltage of the first power source.

The input grayscale may be a grayscale of the first data, and the output grayscale may be a grayscale of the second data.

The compensating may further comprise: generating degradation information of the ith pixel to correspond to accumulation stress information of the ith pixel, detecting a change in drain and source voltages of the driving transistor, and extracting output grayscale information corresponding to the change in the drain and source voltages, so as to generate the second data.

A value of the second data may be set to compensate for the degradation of an OLED.

According to the organic light emitting display device and the driving method thereof according to the present invention, image data are changed to compensate for a degradation of an OLED. In particular, in the present invention, data are changed in consideration of channel length modulation, and thus, OLED degradation may be accurately compensated.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. The various figures are thus not necessarily to scale. It will be understood that when an element is referred to as being "between" two elements, it can be the only element between the two elements, or one or more intervening elements may also be present. Like reference numerals refer to like elements throughout.

DETAILED DESCRIPTION

Figure 1A:
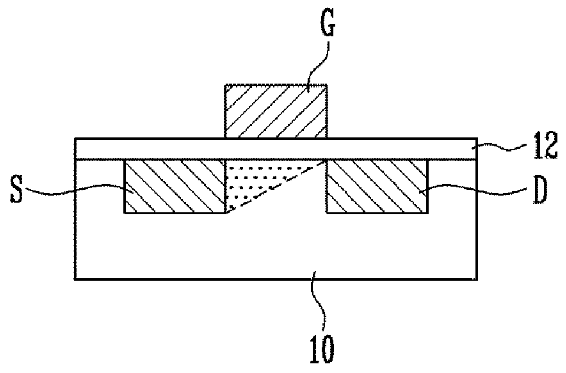
FIGS. 1A and 1B are views schematically illustrating channel length modulation.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. All numerical values are approximate, and may vary. All examples of specific materials and compositions are to be taken as nonlimiting and exemplary only. Other suitable materials and compositions may be used instead.

Figure 1B:
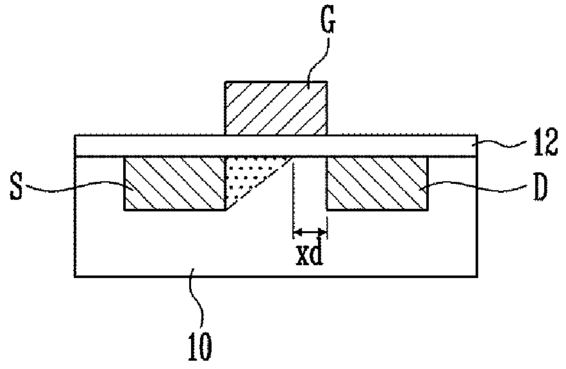

FIGS. 1A and 1B are views schematically illustrating channel length modulation.

Referring to FIGS. 1A and 1B, a source electrode S and a drain electrode D, both formed of a first metal, are formed on a semiconductive substrate 10. A gate electrode G formed of a second metal is formed on an insulating layer 12 interposed between the source electrode S and the drain electrode D. Here, the structure of a transistor illustrated in FIGS. 1A and 1B is schematically illustrated to explain channel length modulation and the present invention is not limited thereto. Instead, the transistor may take on any of various currently known or other forms.

When a voltage is supplied to the gate electrode G, a channel is formed between the source electrode S and the drain electrode D, and the source electrode S and the drain electrode D are electrically connected by the channel. Meanwhile, when a voltage Vds is set to be equal to or greater than a voltage obtained by subtracting a threshold voltage Vth from a voltage (hereinafter, referred to as "Vgs") between the gate electrode G and the source electrode S, the transistor is driven in a saturation region. When the voltage Vds is increased in the saturation region, a channel length is reduced by a predetermined width xd due to an increase in depletions in the region of the drain electrode D, generating channel length modulation.

That is, when the voltage Vds is increased in the saturation region, an effective channel is reduced, and thus a current is increased. This may be expressed by Equation 1.

$$Id=Id'(1+\lambda Vds) \quad \text{[Equation 1]}$$

In Equation 1, Id is a drain current of an actual transistor in consideration of channel length modulation, Id' is a drain current in an ideal case, and λ is a parameter according to channel length modulation, which may be set as a constant value. Here, λ may be set to be different in every transistor according to characteristics of transistors.

Figure 2:
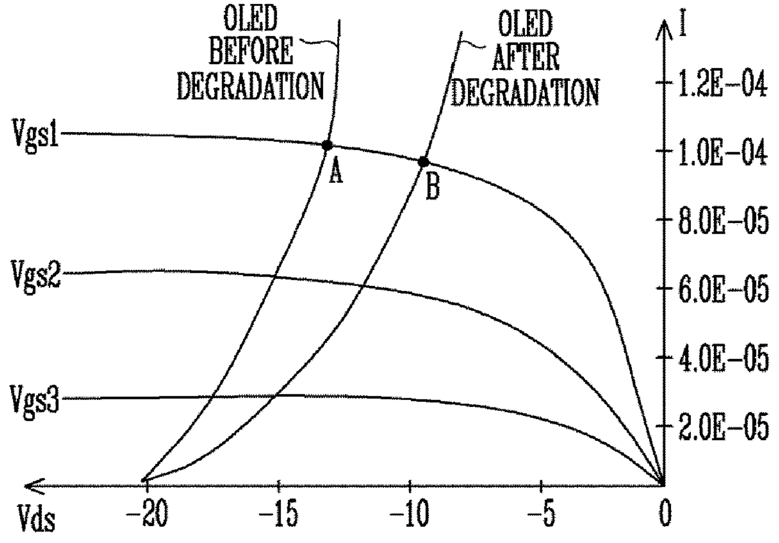
FIG. 2 is a view illustrating a change in current corresponding to degradation of an organic light emitting diode (OLED)

FIG. 2 is a view illustrating a change in current corresponding to degradation in an organic light emitting diode (OLED).

Referring to FIG. 2, a predetermined current I flows through the drain electrode of the transistor to correspond to voltages Vds and Vgs. The amount of current changes according to voltages Vgs, that is, Vgs1, Vgs2, and Vgs3 (that is, a change in current corresponding to a change in a voltage of a data signal). Here, when the OLED is degraded, the voltage Vds applied to the transistor changes due to change in resistance (or a change in a threshold voltage) of the OLED. Thus, when the OLED is degraded, a current value flowing to the drain electrode is changed to correspond to the change in the voltage Vds.

In detail, before OLED degradation, a current "A" flows to correspond to the predetermined voltage Vgs1. Once the OLED degrades, a current "B" lower than the current "A" flows to correspond to the predetermined voltage Vgs1. That is, even though the same data signal (that is, a voltage determining Vgs1) is supplied, an amount of current supplied to the OLED from a driving transistor is lowered to correspond to the degradation of the OLED, and thus, desired luminance is not implemented once OLED degradation occurs.

Figure 3:
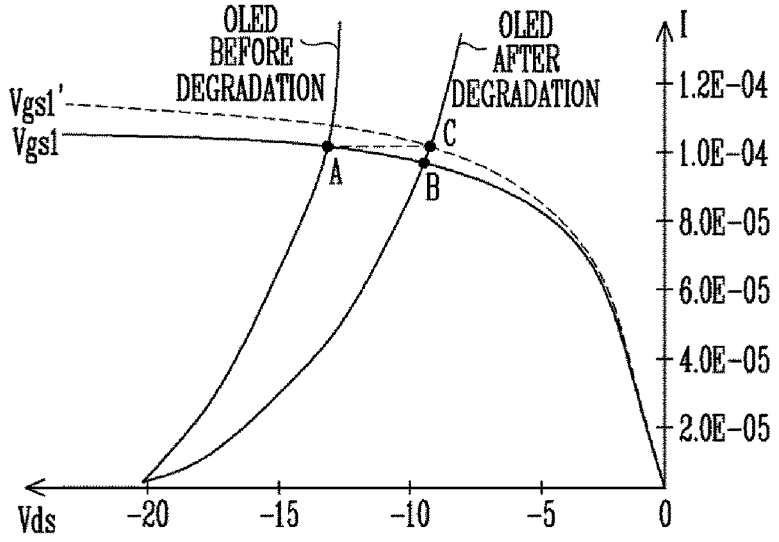
FIG. 3 is a view illustrating a method of compensating for degradation of an OLED according to an embodiment of the present invention.

FIG. 3 is a view illustrating a method of compensating for degradation of an OLED according to an embodiment of the present invention.

Referring to FIG. 3, when the current "B" lower than the current "A" flows due to the degradation of the OLED, a voltage of the data signal should be adjusted to allow a current "C" equal to the current "A" to flow (changed from Vga1 to Vgs1'). However, when only the voltage of the data signal is changed, a desired current value is not supplied due to channel length modulation of the driving transistor. Thus, in embodiments of the present invention, a voltage of a data signal is controlled to compensate for both degradation of the OLED and the channel length modulation of the driving transistor. When the voltage of the data signal is controlled in consideration of both degradation of the OLED and the channel length modulation of the driving transistor, a desired current may flow in each of the pixels.

Figure 4:
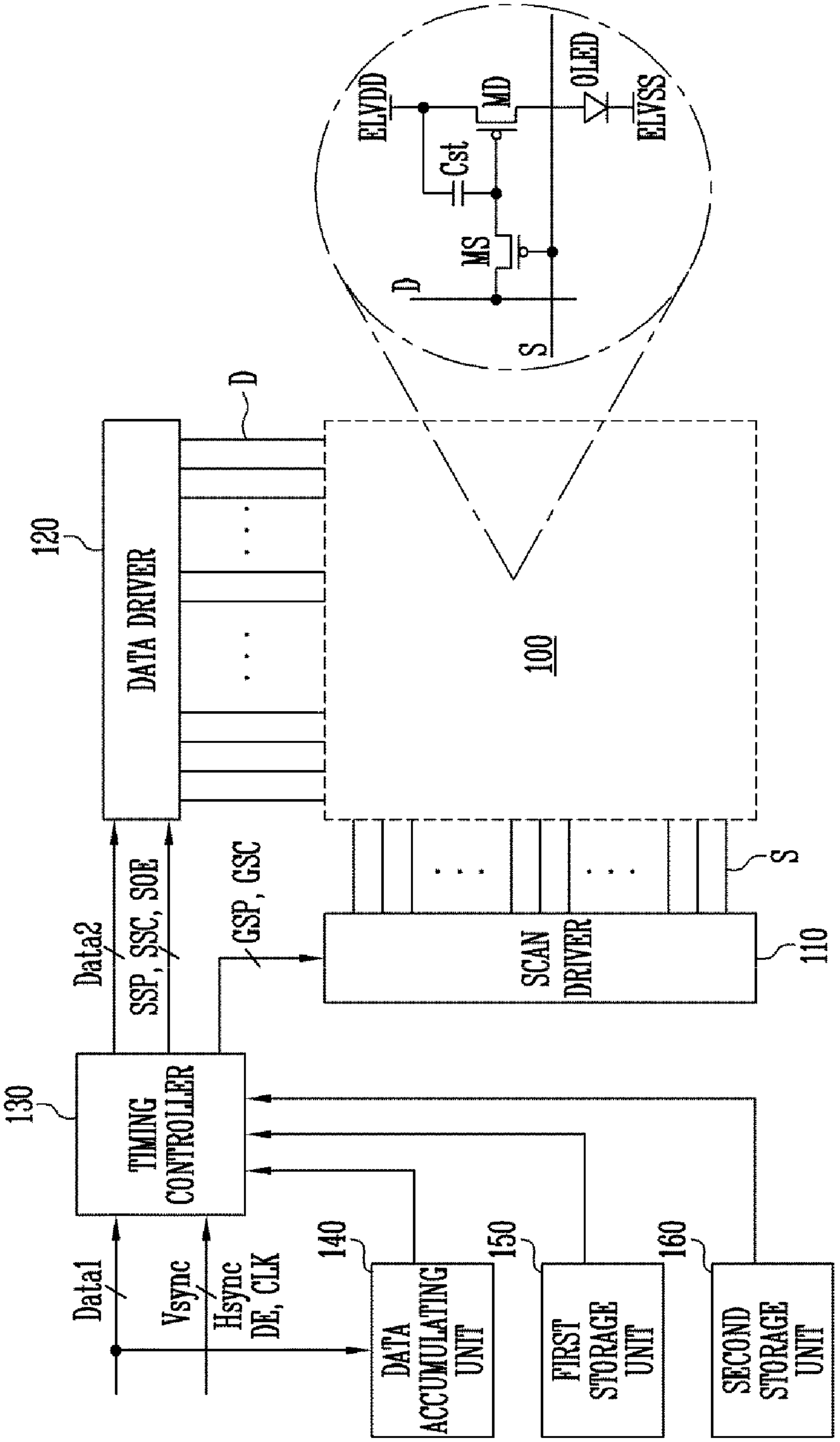
FIG. 4 is a view schematically illustrating an organic light emitting display device according to an embodiment of the present invention.

FIG. 4 is a view schematically illustrating an organic light emitting display device according to an embodiment of the present invention.

Referring to FIG. 4, the organic light emitting display device according to an embodiment of the present invention includes a pixel unit 100, a scan driver 110, a data driver 120, a timing controller 130, a data accumulating unit 140, a first storage unit 150, and a second storage unit 160.

The pixel unit 100 refers to an effective display unit of the display device. The pixel unit 100 includes a plurality of pixels positioned in regions divided by scan lines S and data lines D. Each of the pixels receives a data signal by way of a data line D in response to a scan signal from the scan line S, and generates light having predetermined brightness to correspond to the received data signal.

To this end, each of the pixels includes a plurality of transistors and a storage capacitor Cst. For example, each of the pixels may include a switching transistor MS, a driving transistor MD, an OLED, and the storage capacitor Cst. The switching transistor MS is turned on when a scan signal is supplied to the scan line S, to electrically connect the data line D to a gate electrode of the driving transistor MD. In response to a voltage applied to the gate electrode of the driving transistor MD, the driving transistor MD controls an amount of current flowing from a first power source ELVDD to a second power source ELVSS by way of the OLED. The storage capacitor Cst is connected between the first power source ELVDD and the gate electrode of the driving transistor MD, and stores a voltage corresponding to the data signal. In the present invention, pixels may be implemented as various types of circuits which are currently known.

The scan driver 110 supplies a scan signal to the scan lines S. For example, the scan driver 110 may sequentially supply a scan signal to the scan lines S. When the scan signal is sequentially supplied to the scan lines S, pixels are selected by horizontal lines or rows.

The data driver 120 generates an analog data signal by using second digital data Data2 input from the timing controller 130. The data signal generated by the data driver 120 is supplied to the data lines D such that it is synchronized with the scan signal.

The data accumulating unit 140 accumulates the first data Data1 supplied from an external source. This data is accumulated by pixel. When the first data Data1 is accumulated by pixel, degradation information of each pixel including a light emission time of each pixel, i.e. accumulation stress information, may be known. Data 1 being supplied to the pixels includes information on the currents of the pixels and/or information on the time of light emission of the pixels. OLED included in each pixel deteriorates in response to the current being supplied and the time of the light emission. Therefore, in the case of accumulating Data 1, it is possible to identify deterioration information for each pixel.

Current and voltage change information of the OLED corresponding to the degradation are stored in the first storage unit 150. The current and voltage change information corresponding to the degradation of the OLED are combined with a material of the OLED. In addition, when the current and voltage change information corresponding to the degradation of the OLED are used, Vds voltage change information of the driving transistor MD may be known as illustrated in the graph of FIG. 2. For example, when a threshold voltage of the OLED is increased by 5V to correspond to the degradation of the OLED, the voltage Vds of the driving transistor MD is also changed by 5V.

A compensation value corresponding to the channel length modulation of the driving transistor MD for each pixel is stored in the second storage unit 160. For example, the value $\lambda$ described in Equation 1 may be stored as a compensation value. For example, the compensation value may be measured for each pixel, and stored in the second storage unit 150 before a panel is released. During such measurement, a compensation value corresponding to channel length modulation may be extracted, while changing a voltage supplied to the drain electrode of the driving transistor MD of each pixel, and the extracted compensation value may be stored in the second storage unit 160. Also, a result of simulation to reflect characteristics of the driving transistor MD of each pixel may be stored as a compensation value. That is, compensation values may be determined for each pixel/driving transistor, and may be determined by measurement or simulation.

The timing controller 130 may supply a gate control signal to the scan driver 110 on the basis of first data Data1 and timing control signals Vsync, Hsync, DE, and CLK, and may supply a data control signal to the data driver 120. Also, the timing controller 130 may change bits of the first data Data1 to generate second data Data2, and may supply the generated second data Data2 to the data driver 120. Here, the second data Data2 is set to compensate for the degradation of the OLED included in each of the pixels. Also, the second data Data2 is set to bits of the first data Data1 or more. That is, Data2 is determined by increasing the values of Data1.

The gate control signal includes a gate start pulse (GSP) and one or more gate shift clocks (GSC). The gate start pulse (GSP) controls a timing of a first scan signal. The gate shift clocks (GSC) refer to one or more clock signals for shifting the gate start pulse (GSP).

The data control signal includes a source start pulse (SSP), a source sampling clock (SSC), and a source output enable (SOE) signal. The source start pulse (SSP) controls a sampling start point of the second data Data2 of the data driver 120. The source sampling clock SSC controls a sampling operation of the data driver 120 on the basis of a falling edge or a rising edge. The source output enable (SOE) signal controls an output timing of the data driver 120.

Referring to an operation process, first, the timing controller 130 receives the first data Data1 to be supplied to an ith (i is a natural number) pixel. Upon receiving the first data Data1 for the ith pixel, the timing controller 130 extracts accumulation stress information for the ith pixel from the data accumulating unit 140.

Upon extracting the accumulation stress information of the ith pixel, the timing controller 130 extracts current and voltage change information for the corresponding OLED from the first storage unit 150. Then, Vds voltage change information of the driving transistor MD corresponding to the degradation of the OLED may be known.

Thereafter, the timing controller 130 changes bits of the first data Data1 to be supplied to the ith pixel, to generate second data Data2 such that a desired current may flow to correspond to the compensation value of the ith pixel stored in the second storage unit 160 and the Vds voltage change information of the driving transistor MD.

For example, the timing controller 130 calculates a current value to actually flow to the pixels by multiplying a compensation value by the voltage change information of Vds as in Equation 1. Also, the timing controller 130 generates the second data Data2 by altering values of the first data Data1 such that the calculated current may flow.

The second data Data2 generated by the timing controller 130 is supplied to the data driver 120. Then, the data driver 120 generates a data signal by using the second data Data2, and supplies the generated data signal to a data line connected to an ith pixel. The data signal supplied to the data line is supplied to the ith pixel to correspond to a scan signal. Accordingly, light having desired brightness, regardless of degradation of the OLED, is generated in the ith pixel.

As described above, in embodiments of the present invention, degradation of the OLED is compensated in consideration of channel length modulation, and accordingly, may more accurately reproduce images.

Figure 5:
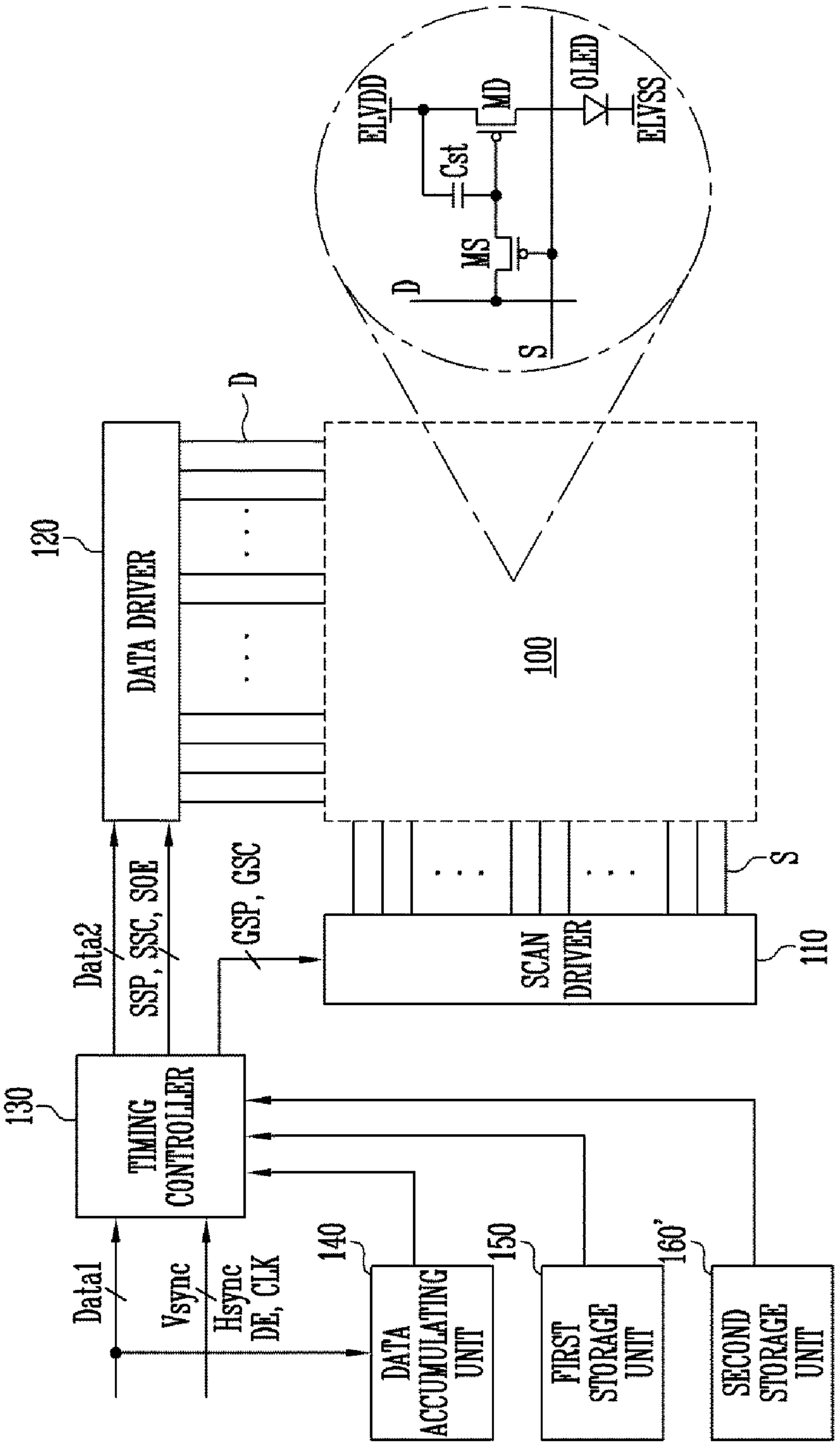
FIG. 5 is a view schematically illustrating an organic light emitting display device according to another embodiment of the present invention.

FIG. 5 is a view schematically illustrating an organic light emitting display device according to another embodiment of the present invention. In describing FIG. 5, the same reference numerals are allocated to the same components as those of FIG. 4, and a detailed description thereof will be omitted.

Referring to FIG. 5, in the organic light emitting display device according to another exemplary embodiment, output grayscale information corresponding to an input grayscale that in turn corresponds to a change in voltage of the first power source ELVDD is stored in a second storage unit 160'. Here, the input grayscale is grayscale information of the first data Data1, and the output grayscale is grayscale information of the second data Data2 modified according to a gamma value.

As described above, when the OLED degrades, the voltage Vds of the driving transistor MD changes. Here, when a voltage of the first power source ELVDD is changed, a current value corresponding to the change in the voltage Vds of the driving transistor MD may be measured. For example, when the first power source ELVDD is changed by 2V, the voltage Vds of the driving transistor MD is regarded as having been changed by 2V.

In detail, when an actual voltage of the first power source ELVDD is set to 17V, output grayscale information corresponding to at least 2V lower than the actual application voltage is stored in the second storage unit 160'.

Figure 6:
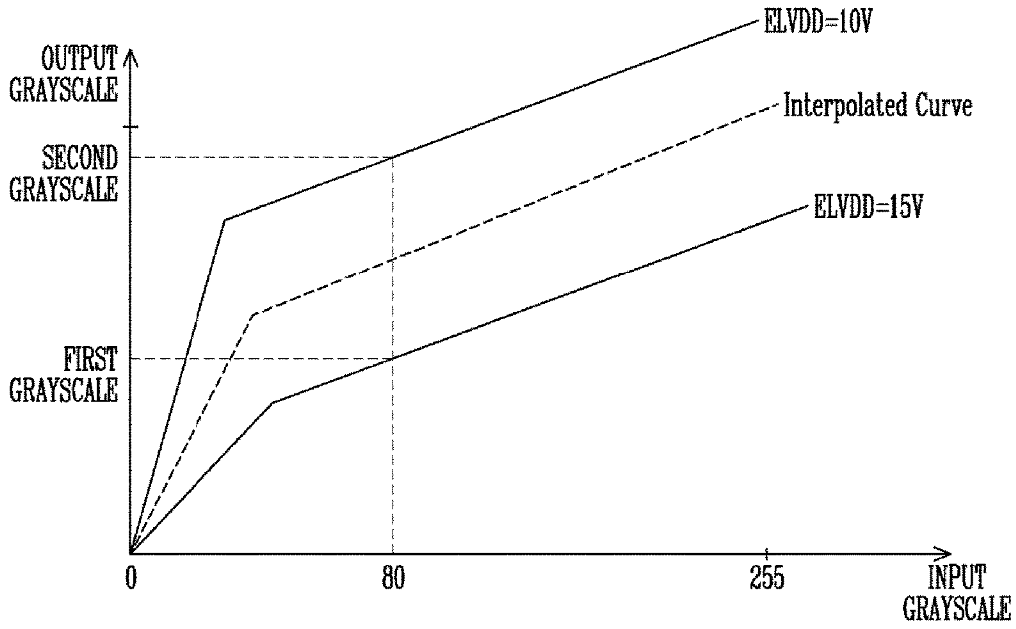
FIG. 6 is a view illustrating an embodiment of output grayscale information corresponding to input grayscale stored in a second storage unit of FIG. 5.

For example, as illustrated in FIG. 6, a voltage of the first power source ELVDD is set to 15V and voltages corresponding to the 0 to 255 grayscales are sequentially applied to the gate electrode of the driving transistor MD of each pixel. Then, currents corresponding to the 0 to 255 grayscales flow to the OLED through each of the driving transistors MD. Here, the current flowing to the OLED is measured, and an output grayscale is set to have a predetermined gamma value (for example, 2.2 gamma).

Similarly, a voltage of the power first power source ELVDD is set to 10V, and voltages corresponding to the 0 to 255 grayscales are sequentially applied to the gate electrode of the driving transistor MD of each pixel. Then, currents corresponding to the 0 to 255 grayscales flow to the OLED in each of the driving transistors MD. Here, currents flowing to the OLED are measured, and an output grayscale is set to have a predetermined gamma value (for example, 2.2 gamma).

Here, the output grayscale is set to compensate for the degradation of the OLED to correspond to the change in the voltage of the first power source ELVDD. For example, when a grayscale of "80" is input and the first power source ELVDD is set to 15V, an output grayscale is set to a first grayscale. Also, when a grayscale of "80" is input with the first power source ELVDD set to 10V, an output grayscale is set to a second grayscale different from the first grayscale.

The output grayscale information corresponding to the change in the voltage of the first power source ELVDD is stored in the second storage unit 160'. Here, the output grayscale information stored in the second storage unit 160' corresponds to the current actually flowing in the driving transistor MD, and is set such that channel length modulation is naturally compensated. In some embodiments, the output grayscale information corresponding to the change in voltage of the first power source ELVDD is stored in the second storage unit 160' before a panel is released.

In operation, the timing controller 130 receives the first data Data1 to be supplied to the ith (i is a natural number) pixel. Upon receiving the first data Data1, the timing controller 130 extracts accumulation stress information for the ith pixel from the data accumulating unit 140.

Upon extracting the accumulation stress information for the ith pixel, the timing controller 130 extracts current and voltage change information of the OLED from the first storage unit 150 to correspond to the accumulation stress information. Then, the Vds voltage change information of the driving transistor MD corresponding to the degradation of the OLED may be known.

Thereafter, the timing controller 130 extracts output grayscale information corresponding to a change in the voltage Vds of the driving transistor MD from the second storage unit 160'. For example, the voltage Vds of the driving transistor MDD is changed by 2V, and the first data Data1 to be supplied to the ith pixel may be set to a grayscale of "80". Here, the timing controller 130 may select a first grayscale as an output grayscale to correspond to the input grayscale of "80", where this first grayscale is selected according to a voltage curve of the first power source ELVDD of 15V stored in the second storage unit 160'.

Upon selecting the output grayscale, the timing controller 130 generates second data Data2 by changing bits of the first data Data1 to be supplied to the ith pixel according to the output grayscale. The second data Data2 generated by the timing controller 130 is supplied to the data driver 120. Then, the data driver 120 generates a data signal by using the second data Data2 and supplies the generated data signal to the data line connected to the ith pixel. The data signal supplied to the data line is supplied to the ith pixel to correspond to a scan signal. Then, light having desired brightness regardless of degradation of the OLED may be generated in the ith pixel.

Alternatively, the output grayscale corresponding to the Vds voltage change of the driving transistor MD may not be stored in the second storage unit 160'. In this case, the timing controller 130 may generate an output grayscale by using two or more pieces of output grayscale information stored in the second storage unit 160'. For example, output grayscale information corresponding to an input grayscale between the first power source ELVDD of 10V and the first power source ELVDD of 15V may be extracted by using interpolation (interpolated curve is generated).

In addition, in embodiments of the present invention, transistors included in the pixels are illustrated as PMOS transistors for the purposes of description, but the present invention is not limited thereto. In other words, the transistors may be formed as NMOS or other suitable transistors.

Also, the OLED may generate light having various colors including red, green, and blue colors according to an amount of current supplied form the driving transistor, but the present invention is not limited thereto. For example, the OLED may generate white light according to an amount of current supplied from the driving transistor. In this case, a color image is implemented by using a separate color filter.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims. Various features of the above described and other embodiments can be mixed and matched in any manner, to produce further embodiments consistent with the invention.

What is claimed is:

1. An organic light emitting display device comprising:
- pixels including driving transistors disposed in regions defined by scan lines and data lines;
- a data accumulator arranged to accumulate first data;
- a first storage storing current and voltage change information corresponding to a degradation of an organic light emitting diode;
- a second storage storing a compensation value corresponding at least partially to a channel length modulation of the driving transistors; and
- a timing controller altering the first data corresponding to an ith (where i is a natural number) pixel and generating second data to be supplied to the ith pixel, the altering carried out according to:
  - accumulation stress information for the ith pixel, the accumulation stress information corresponding to the accumulated first data and being stored in the data accumulator,
  - the current and voltage change information, and
  - the compensation value corresponding to the ith pixel.

2. The organic light emitting display device of claim 1, wherein a value of the second data is set so as to compensate for the degradation of the organic light emitting diode included in the ith pixel.

3. The organic light emitting display device of claim 1, further comprising: a data driver generating a data signal by using the second data to be supplied to the ith pixel, and supplying the data signal to a data line connected to the ith pixel.

4. An organic light emitting display device comprising:
- pixels including driving transistors disposed in regions defined by scan lines and data lines, each of the driving transistors controlling an amount of current flowing from a first power source to a second power source by way of an organic light emitting diode;
- a data accumulator arranged to accumulate first data;
- a first storage storing current and voltage change information corresponding to a degradation of the organic light emitting diode;
- a second storage storing output grayscale information for compensating an input grayscale for a change in a voltage of the first power source; and
- a timing controller altering the first data corresponding to an ith (where i is a natural number) pixel so as to generate second data to be supplied to the ith pixel, the altering carried out according to:
  - accumulation stress information for the ith pixel, the accumulation stress information corresponding to the accumulated first data and being stored in the data accumulator,
  - the current and voltage change information, and
  - output grayscale information corresponding to the ith pixel.

5. The organic light emitting display device of claim 4, wherein a value of the second data is set so as to compensate for the degradation of the organic light emitting diode included in the ith pixel.

6. The organic light emitting display device of claim 4, wherein the input grayscale is a grayscale of the first data, and the output grayscale is a grayscale of the second data.

7. The organic light emitting display device of claim 4, wherein the output grayscale information corresponds to two or more voltage values of the first power source.

8. The organic light emitting display device of claim 7, wherein the timing controller
- extracts degradation information for the ith pixel, the degradation information corresponding to accumulation stress information for the ith pixel,
- detects a change in drain and source voltages of the driving transistor, the change in drain and source voltages corresponding to the extracted degradation information, and
- extracts the output grayscale information from the second storage, the output grayscale information corresponding to the change in drain and source voltages.

9. The organic light emitting display device of claim 7, wherein the timing controller interpolates the output grayscale information from the two or more voltage values of the first power source.

10. The organic light emitting display device of claim 4, further comprising:

a data driver generating a data signal by using second data to be supplied to the ith pixel and supplying the data signal to a data line connected to the ith pixel.

11. A method of driving an organic light emitting display device, the method comprising:

storing current and voltage change information in a first storage, the current and voltage change information corresponding to a degradation of an organic light emitting diode;

storing compensation information in a second storage, the compensation information corresponding to channel length modulation for driving transistors of pixels of the display device;

accumulating first data in a data accumulator, the first data corresponding to one or more images to be displayed by the pixels; and compensating first data corresponding to an ith (where i is a natural number) pixel by using accumulation stress information of the ith pixel, the current and voltage change information, and the compensation information, so as to generate second data to be supplied to the ith pixel.

12. The method of claim 11, wherein the compensation information comprises at least one value for compensating for the channel length modulation of the driving transistors.

13. The method of claim 11, wherein the compensation information is output grayscale information for altering an input grayscale according to a change in the voltage of a first power source.

14. The method of claim 13, wherein the input grayscale is a grayscale of the first data, and the output grayscale is a grayscale of the second data.

15. The method of claim 13, wherein the compensating further comprises:

generating degradation information of the ith pixel to correspond to accumulation stress information of the ith pixel, detecting a change in drain and source voltages of the driving transistor, and extracting output grayscale information corresponding to the change in the drain and source voltages, so as to generate the second data.

16. The method of claim 11, wherein a value of the second data is set to compensate for the degradation of an organic light emitting diode.

* * * * *